(12) United States Patent
Thanos et al.

(10) Patent No.: US 9,998,326 B2
(45) Date of Patent: Jun. 12, 2018

(54) SYSTEMS AND METHODS FOR TOUCH-LESS COMMISSIONING OF INTELLIGENT ELECTRONIC DEVICES

(71) Applicant: General Electric Company, Schenectady, NY (US)

(72) Inventors: Daniel Thanos, Stoufville (CA); Janahan Skandaraniyam, Markham (CA); Anca Cioraca, Toronto (CA)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 14/180,251

(22) Filed: Feb. 13, 2014

(65) Prior Publication Data

US 2015/0229516 A1    Aug. 13, 2015

(51) Int. Cl.
*H04L 12/24* (2006.01)
*H04W 88/08* (2009.01)

(52) U.S. Cl.
CPC ......... *H04L 41/0809* (2013.01); *H04W 88/08* (2013.01); *Y04S 40/162* (2013.01)

(58) Field of Classification Search
None
See application file for complete search history.

(56) References Cited

U.S. PATENT DOCUMENTS

| | | | |
|---|---|---|---|
| 2006/0155422 A1* | 7/2006 | Uy et al. | 700/286 |
| 2006/0248007 A1* | 11/2006 | Hofer et al. | 705/40 |
| 2008/0205339 A1* | 8/2008 | Brophy | H04W 8/245 370/331 |
| 2008/0235355 A1* | 9/2008 | Spanier et al. | 709/219 |
| 2009/0228224 A1* | 9/2009 | Spanier et al. | 702/60 |
| 2010/0031076 A1* | 2/2010 | Wan et al. | 713/340 |
| 2011/0161468 A1 | 6/2011 | Tuckey et al. | |
| 2013/0198245 A1* | 8/2013 | Kagan et al. | 707/812 |
| 2013/0262850 A1 | 10/2013 | Canpolat et al. | |
| 2013/0290563 A1* | 10/2013 | Fleischman et al. | 709/245 |
| 2013/0326069 A1* | 12/2013 | Wang | H04W 24/02 709/227 |

(Continued)

OTHER PUBLICATIONS

U.S. Appl. No. 13/836,962, filed Mar. 15, 2013, Cioraca et al.
European Search Report and Opinion issued in connection with corresponding EP Application No. 15154660.3 dated Sep. 8, 2015.

*Primary Examiner* — Hicham Foud
(74) *Attorney, Agent, or Firm* — Armstrong Teasdale LLP

(57) ABSTRACT

The subject matter disclosed herein relates to intelligent electronic devices (IEDs), and, more specifically, to systems and methods for initial configuration or commissioning of IEDs after installation. In an embodiment, a system includes an intelligent electronic device (IED) configuring system having an IED that is configured with a wireless network configuration prior to deployment that enables the IED to automatically connect to a particular wireless network when it is detected. The IED configuring system also includes an IED configuring device configured to host the particular wireless network according to the wireless network configuration of the IED. Furthermore, the IED configuring device is configured to communicate a plurality of configuration settings to the IED via the wireless network to commission the IED once the IED has connected to the wireless network.

18 Claims, 9 Drawing Sheets

(56) References Cited

U.S. PATENT DOCUMENTS

2013/0347073 A1* 12/2013 Bryksa ................. H04L 63/105
                                                        726/4
2014/0113628 A1*  4/2014 Sundararajan et al. ... 455/435.2
2014/0277801 A1   9/2014 Cioraca et al.
2014/0376528 A1* 12/2014 Madonna et al. ............ 370/338

* cited by examiner

SYSTEMS AND METHODS FOR TOUCH-LESS COMMISSIONING OF INTELLIGENT ELECTRONIC DEVICES

BACKGROUND

The subject matter disclosed herein relates to intelligent electronic devices (IEDs), and, more specifically, to systems and methods for initial configuration or commissioning of IEDs after installation.

Some systems, such as protection and control systems, industrial plants, or power distribution systems, may include intelligent electronic devices (IEDs). IEDs may be configured to provide metering, protection, and/or control functions within such systems. For example, an IED may receive data measurements from power equipment, such as a transformer, and transmit a status to a management device based on the received measurement. Accordingly, the IED may receive control signals from a management device to control the IED and send data signals to communicate data to the management device. These protection and control systems may include high voltage equipment, and thus it may be beneficial to enable operators to communicate with the IEDs at a distance in a secure manner.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In an embodiment, a system includes an intelligent electronic device (IED) configuring system having an IED that is configured with a wireless network configuration prior to deployment that enables the IED to automatically connect to a particular wireless network when the IED detects the wireless network. The IED configuring system also includes an IED configuring device configured to host the particular wireless network according to the wireless network configuration of the IED. Furthermore, the IED configuring device is configured to communicate a plurality of configuration settings to the IED via the wireless network to commission the IED once the IED has connected to the wireless network.

In another embodiment, a method includes storing, in a memory device of an intelligent electronic device (IED), a wireless network configuration that includes a service set identifier (SSID) of a wireless network and a network security key or passphrase of the wireless network. The method includes operating the IED in wireless commissioning mode, wherein wireless commissioning mode involves the IED automatically searching for and connecting to the wireless network using the stored wireless network configuration. The method includes locating and connecting to the wireless network while operating in wireless commissioning mode. The method further includes receiving a plurality of IED configuration settings from a processor coupled to the wireless network and commissioning the IED by updating a configuration of the IED stored in the memory device of the IED with the received plurality of IED configuration settings.

In another embodiment, a method executable by a processor of an intelligent electronic device (IED), includes storing, in a memory device of an intelligent electronic device (IED) configuring device, a wireless network configuration that includes a service set identifier (SSID) of a wireless network and a network security key or passphrase of the wireless network. The method includes operating the IED configuring device in automatic discovery mode, wherein automatic discovery mode involves activating a communication module of the IED configuring device to establish the wireless network based on the wireless network configuration. The method further includes authenticating one or more credentials provided by an IED and allowing the IED to connect to the wireless network.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
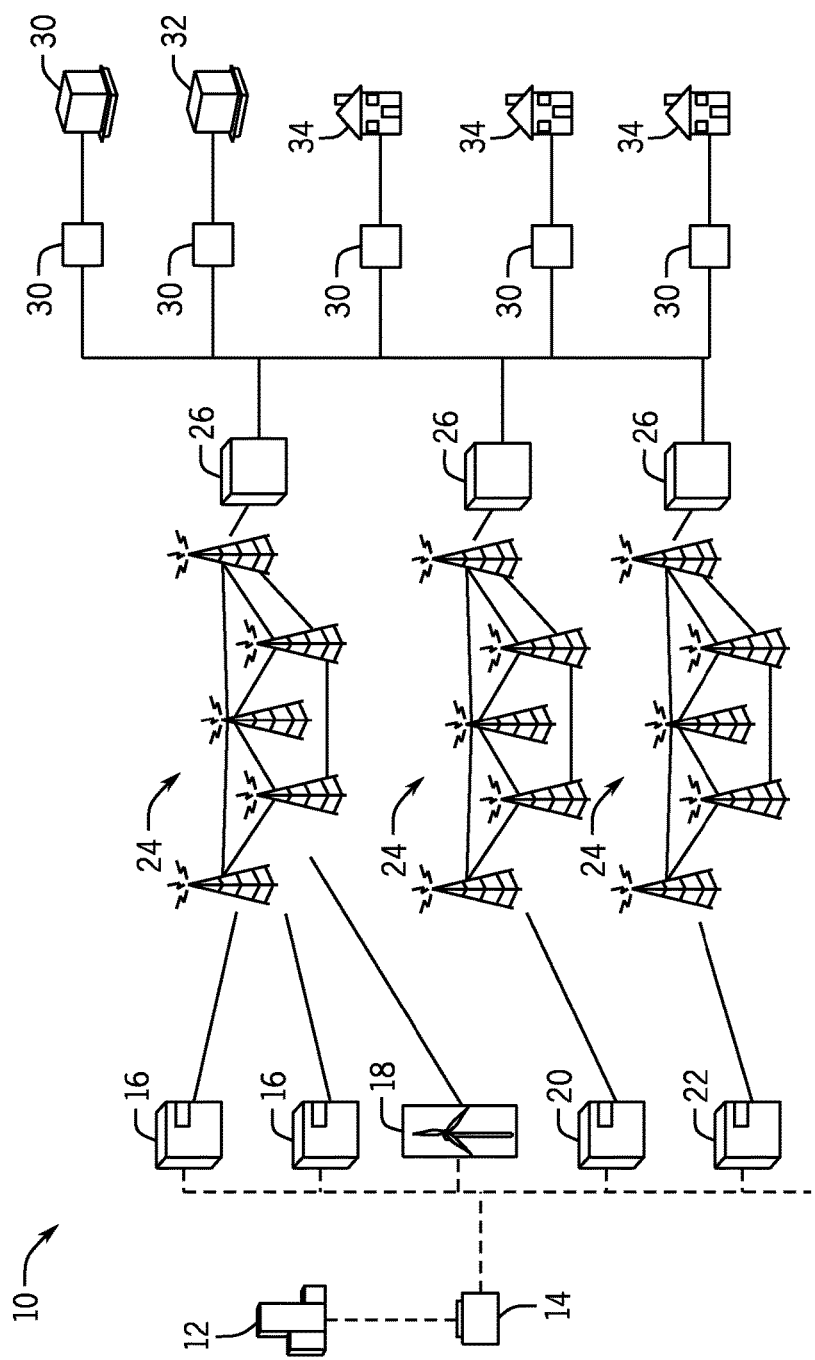
FIG. 1 is a block diagram of an embodiment of a generation, transmission, and distribution control system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed towards improving the initial configuration, also referred to as the commissioning, of intelligent electronic devices (IEDs) disposed in a system, such as a protection and control system, an industrial plant, a power substation, or a distribution system. As mentioned, within such system, IEDs may provide functions such as metering, protection, and/or control functions. For example, the IED may be coupled to power equipment (e.g., breakers, transformers, switches, motors, or generators) and may be configured to receive measurements (e.g., frequency measurements, voltage measurements, and current measurements) from the power equipment. In addition, the IED may be configured to send control commands to the power equipment to control the functioning of the power equipment. Furthermore, based on the received measurements, the control commands may be protection control commands to the power equipment, such as to trip a breaker. Accordingly, the control system may be configured to enable an operator to send command information to the IED and to receive data from IED. Since the control systems may include IEDs controlling high voltage equipment, IEDs disposed in hard to reach locations, and/or a multitude of IEDs spread over a large physical space, it may be beneficial to enable the operator to configure the IEDs at a distance and in a secure manner.

Accordingly, embodiments of the present disclosure provide systems and methods to enable an installed IED to be commissioned (e.g., initially configured) without physically interacting with the IED. That is, present embodiments provide systems and methods that enable a touch-less initial configuration of an IED using a secured communication via a wireless local area network (WLAN) based on the Institute of Electrical and Electronics Engineers (IEEE) 802.11x (e.g., 802.11a, 802.11b, 802.11g, 802.11n, etc.) standard. As set forth in detail below, in certain embodiments, aspects of the present approach include pre-configuring the IED (e.g., prior to deployment) to enable the IED to operate in a wireless commissioning mode. When operating in wireless commissioning mode, the IED may automatically establish a secure wireless connection to an IED configuring device in order for the initial configuration of the IED to be performed. In certain embodiments, the IED configuring device provides an interface (e.g., a graphical user interface) whereby an operator may select configuration options for commissioning the IED. The IED configuring device also provides wireless access point (WAP) functionality to enable the IED to wirelessly communicate with a processor of the IED configuring device to receive the configuration options selected by the operator for the initial configuration of the IED. As set forth in detail below, in certain embodiments, the IED configuring device may include automatic discovery functionality to enable a more simplified IED identification and commissioning process for the operator.

With the foregoing in mind, it may be useful to describe an embodiment of an IED based system, such as a power grid system 10 including a power distribution system illustrated in FIG. 1. As depicted, the power grid system 10 may include one or more utilities 12. The utility 12 may provide for oversight operations of the power grid system 10. While the present discussion is directed toward power utilities 12, it should be understood that the presently disclosed systems and methods are applicable to other types of utility systems (e.g., water, sewer, natural gas management systems) as well as other types of industrial control and monitoring systems (e.g., wind, water, or gas turbine systems, petroleum refineries, chemical production facilities, automated manufacturing facilities). For the illustrated power grid system 10, management device (e.g., utility control centers 14) may monitor and direct power produced by one or more power generation stations 16 and alternative power generation stations 18. The power generation stations 16 may include conventional power generation stations, such as power generation stations using gas, coal, biomass, and other carbonaceous products for fuel. The alternative power generation stations 18 may include power generation stations using solar power, wind power, hydroelectric power, geothermal power, and other alternative sources of power (e.g., renewable energy) to produce electricity. Other infrastructure components may include a water power producing plant 20 and geothermal power producing plant 22. For example, water power producing plants 20 may provide for hydroelectric power generation, and geothermal power producing plants 22 may provide for geothermal power generation.

The power generated by the power generation stations 16, 18, 20, and 22 may be transmitted through a power transmission grid 24. The power transmission grid 24 may cover a broad geographic region or regions, such as one or more municipalities, states, or countries. The transmission grid 24 may also be a single phase alternating current (AC) system, but most generally may be a three-phase AC current system. As depicted, the power transmission grid 24 may include a series of towers to support a series of overhead electrical conductors in various configurations. For example, extreme high voltage (EHV) conductors may be arranged in a three conductor bundle, which includes a conductor for each of three phases. The power transmission grid 24 may support nominal system voltages in the ranges of 110 kilovolts (kV) to 765 kilovolts (kV). In the depicted embodiment, the power transmission grid 24 may be electrically coupled to distribution systems (e.g., power distribution substation 26). The power distribution substation 26 may include transformers to transform the voltage of the incoming power from a transmission voltage (e.g., 765 kV, 500 kV, 345 kV, or 138 kV) to primary (e.g., 13.8 kV or 4160V) and secondary (e.g., 480V, 230V, or 120V) distribution voltages. For example, industrial electric power consumers 30 (e.g., production plants) may use a primary distribution voltage of 13.8 kV, while power delivered to commercial consumers 32 and residential 34 consumers may be in the secondary distribution voltage range of 120V to 480V.

Figure 2:
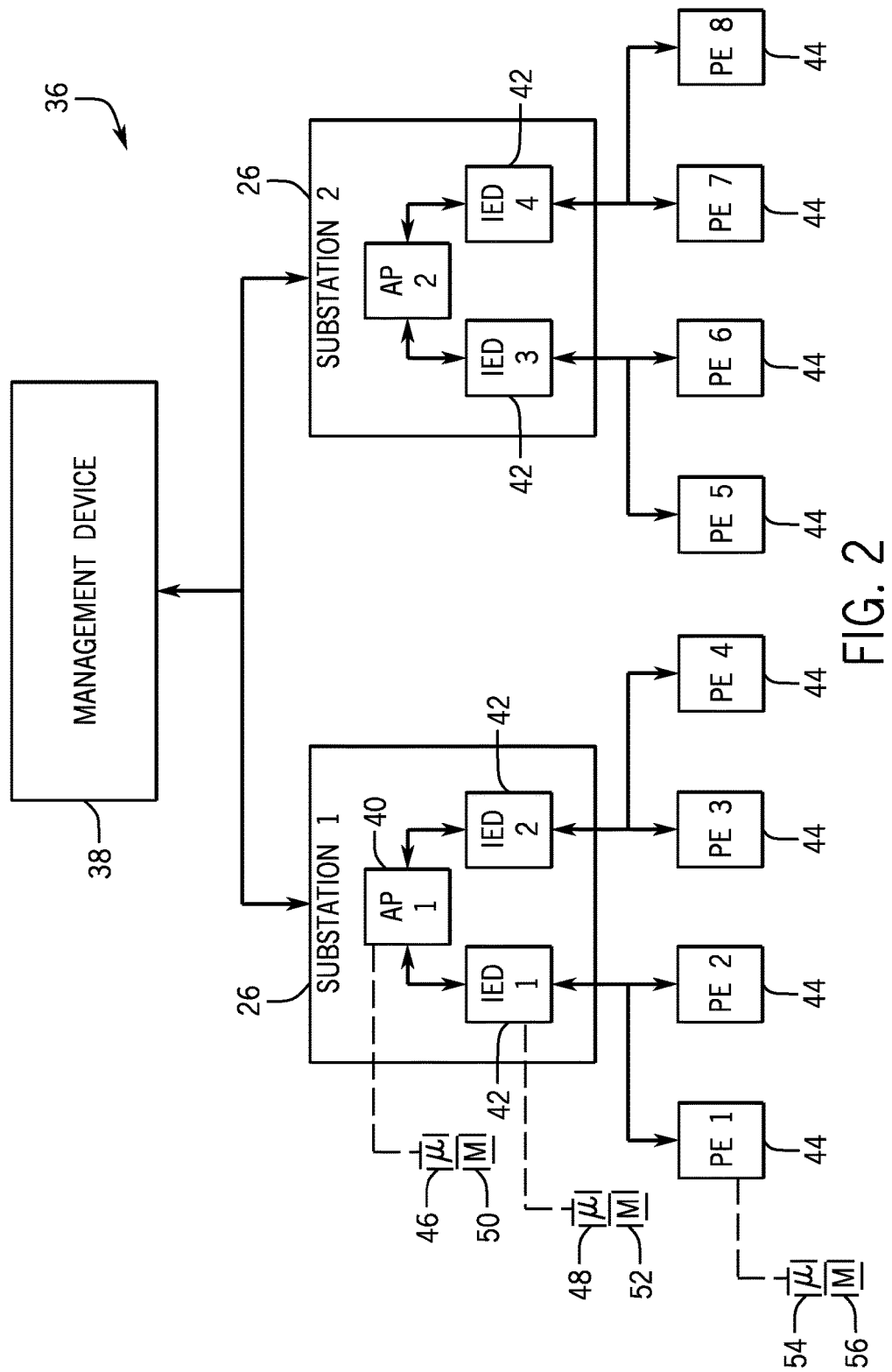
FIG. 2 is a block diagram of an embodiment of a protection and control system depicted in FIG. 1 with a management center and multiple substations each including multiple intelligent electronic devices (IEDs)

As described above, the power distribution substation 26 may be part of the power grid system 10. Accordingly, the power transmission grid 24 and power distribution substation 26 may include various digital and automated technologies, such as intelligent electronic devices (IEDs), to communicate with (e.g., send control commands to and receive measurements from) power equipment such as transformers, motors, generators, switches, breakers, reclosers, or any component of the system 10. Accordingly, FIG. 2 depicts a general configuration of a protection and control system 36, which may be included in systems such as the power grid system 10, an industrial plant, or a power distribution system (i.e., power distribution substations 26). The system 36 is illustrated as including a management device 38, various substations 26, including access points 40 and IEDs 42, and various power equipment 44. As depicted, the management device 38 is communicatively coupled to multiple power distribution substations 26. The management device 38 may be communicatively coupled to the substations 26 in various ways. For example, the management device 38 may communicate with the substations 26 via a wide area network (WAN), a local area network (LAN), a personal area network (PAN), wireless networks, secure networks, and the like.

As depicted, the access point 40 is communicatively coupled to multiple IEDs 42, which facilitates communication between the access point 40 and the IEDs 42. For example, the access point 40 may be configured to relay configuration information and/or command information to the IED 42 from the management device 38. In some embodiments, the command information may instruct the IED 42 to read an actual value or a setting. In addition, the IED 42 may be configured to send data to the access point 40, and the access point 40 may be configured to concentrate (e.g., accumulate or aggregate) the data received from the IED 42. In some embodiments, the data may include measurements received from the power equipment 44, such as sensor measurements (real-time, near real-time or delayed), measurement logs, a status, alarms, alerts, values computed by the equipment 44 such as statistics values, or any combination thereof. To facilitate these functions and the functions described below, the access point 40 and the IED 42 may include processors 46 and 48, respectively, useful in executing computer instructions, and may also include memory 50 and 52, useful in storing computer instructions and other data. In certain embodiments, the access point 40 may be a SCADA Gateway Communication Device, such as a D400, a D20MX, a D20, and the like, available from General Electric Company, of Schenectady, N.Y. Specifically, the SCADA Gateway Communication Devices may include the features of the access point 40. For example, the D400 may concentrate data collected from the IEDs 42 installed in the substation 26 by requesting and receiving information from connected IEDs 42 through a network, such as a LAN. In addition, the D400 may manipulate the data from devices to produce additional local/pseudo data points, present the data collected to a SCADA system, monitor power equipment 44 for alarm conditions, issue alarms, visually present data to an operator, and provide transparent access to IEDs 42 and/or power equipment 44. Additionally, the IED 42 may be a Universal Relay, such as a N60, a L90, a T60, a B90, a G60, an 8 Series device (e.g., a 850), and the like, available from General Electric Company, of Schenectady, N.Y. Accordingly, the Universal Relays may include the features of the IED 42. For example, the L90 is multi-functional and provides protection, control, and metering functions. Accordingly, Universal Relays may reduce cabling and auxiliaries significantly. In addition, the Universal Relays may transfer data to a central control facilities and/or human machine interfaces (HMI).

As described above, the IED 42 may be configured to perform metering, protection, and/or control functions. Accordingly, as depicted, the IEDs 42 are communicatively coupled to the power equipment 44, which may include transformers, motors, generators, switches, breakers, and/or reclosers. The IED 42 may perform metering functions by receiving measurements, such as current, voltage, temperature, and/or frequency, from the power equipment 44. It may be appreciated that, in other embodiments, the IED 42 may be capable of performing any suitable monitoring or measurement function (e.g., temperature, pressure, flow rate, gas composition, speed, position, humidity, vibration, clearance, etc.) without negating the effect of the present approach. As such, the power equipment 44 may derive and send the measurements to the IED 42. To facilitate deriving and sending measurements, the power equipment 44 may include a processor 54 useful in executing computer instructions, and a memory 56, useful in storing computer instructions and other data. In addition, based on received measurements, the IED 42 may derive measurement logs, determine a status of the power equipment 44, and/or determine certain values. For example, the IED 42 may determine a phase current, a phase voltage, a power, an energy, a demand (e.g., power demand), a frequency, and the like. Additionally, the IED 42 may determine the status of contact inputs, virtual inputs, remote inputs, remote double-point status inputs, teleprotection inputs, contact outputs, virtual outputs, remote devices, digital counters, selector switches, flex states, direct inputs, direct devices, direct integer input, teleprotection channel tests, Ethernet switch, and the like.

The IED 42 may perform control functions by sending control information to the power equipment 44 to instruct the power equipment 44 to take a desired action. In some instances, the desired action may include a protection function. For example, the IED 42 may instruct the power equipment 44, such as a circuit breaker, to trip if the power equipment 44 senses a measurement above a threshold and/or an anomaly in the measurements. These measurements may include current differential, directional phase overcurrent, directional neutral overcurrent, negative-sequence overcurrent, undervoltage, overvoltage, and distance protection. Further examples of additional features and functionality of the systems 10 and 36 illustrated in FIGS. 1 and 2 are described in U.S. patent application Ser. No. 13/836,962, entitled, "WIRELESS COMMUNICATION SYSTEMS AND METHODS FOR INTELLIGENT ELECTRONIC DEVICES", filed Mar. 15, 2013, which is hereby incorporated by reference in its entirety for all purposes.

Figure 3:
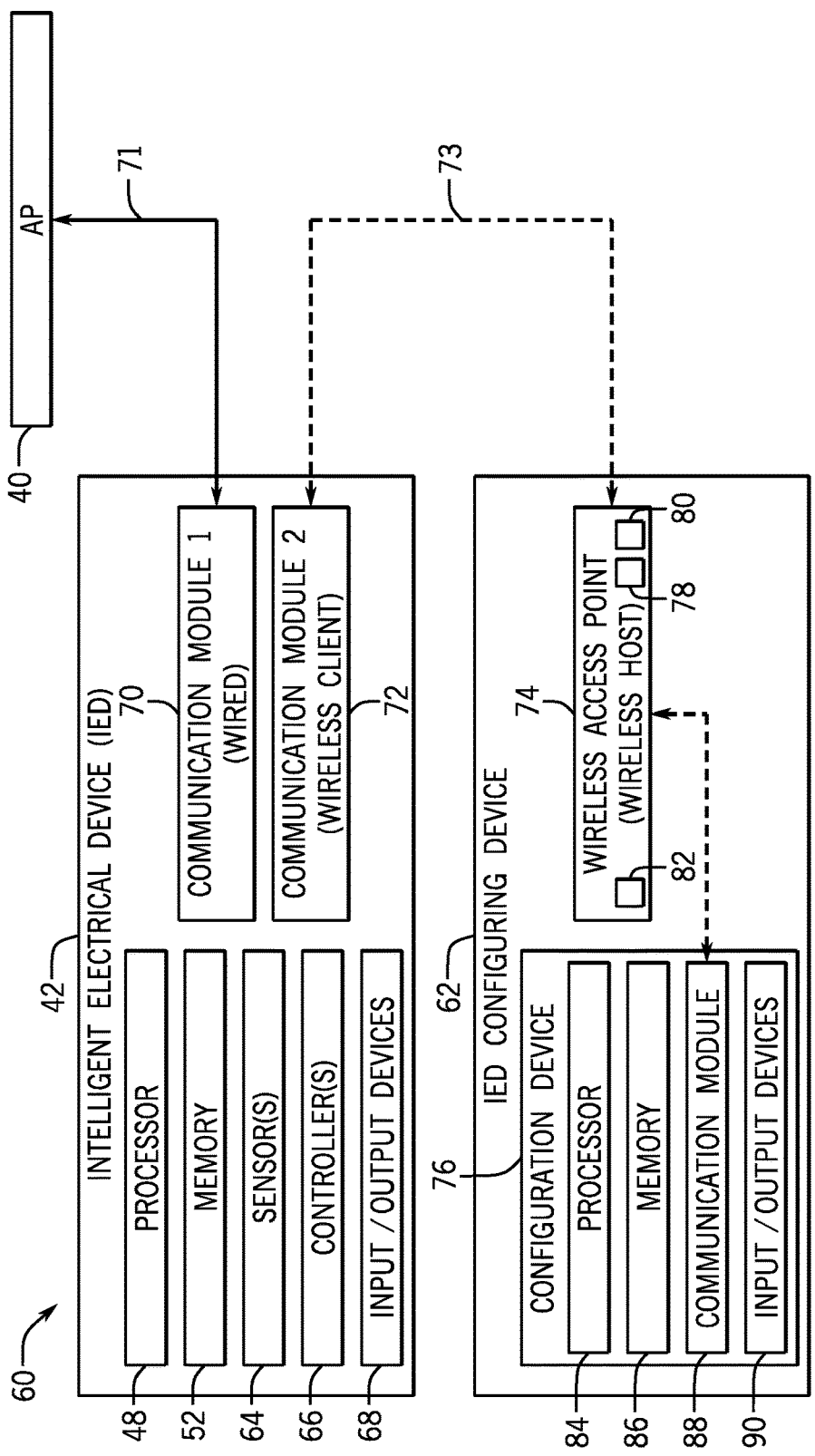
FIG. 3 is a block diagram of an embodiment of an IED configuring system having an IED configuring device that includes a wireless access point.

When a new IED is installed within a system, such as the protection and control system 36 discussed above, the IED may undergo commissioning, in which the default (e.g., factory installed) IED configuration settings may be updated with IED configuration settings to define the identity and the desired behavior of the IED within the system. For example, as mentioned above, the IED configuration settings may define parameters of the IED 42 relating to product setup, remote resources, grouped elements, control elements, inputs/outputs, transducer inputs/outputs, tests, and the like. With this in mind, FIG. 3 illustrates an embodiment of an IED configuring system 60 in accordance with the present technique. The IED configuring system 60 includes the IED 42 being commissioned as well as an IED configuring device 62. As set forth above, the illustrated IED 42 includes a processor 48 and a memory 52, and the IED 42 may use the processor 48 to execute instructions (e.g., firmware, applications, programs, routines, etc.) stored in the memory 52 during operation. The illustrated IED 42 also includes one or more sensors 64 that may allow the IED to perform measurements (e.g., voltage, current, load, temperature, pressure, flow rate, etc.) pertaining to the operation of the protection and control system 36 that may be reported to the management device 38 via the access point 40. The illustrated IED 42 also includes one or more controllers 66 that are capable of sending control signals to one or more pieces of power equipment 44 based on instructions received from the management device 38 via the access point 40. Additionally, the illustrated IED 42 includes one or more input and output devices 68 (e.g., touchscreens, control panels, pointing devices, keyboards, etc.) that may enable an operator to directly interface (e.g., physically interact) with the IED 42. However, while the one or more input and output devices 68 may be present in certain embodiments, it may be appreciated that the presently disclosed technique enables the commissioning of the IED 42 without the operator having to directly interface (e.g., physically interact) with the IED 42.

The IED 42 illustrated in FIG. 3 includes two communication modules. For the illustrated embodiment, the first communication module 70 is a wired network interface card (NIC) (e.g., an Ethernet NIC) that enables communication between the IED 42 and the access point 40 on the wired network 71. As mentioned above, the access point 40 may bridge communications between the IED 42 and the management device 38, as illustrated in FIG. 2. The second communication module 72 for the illustrated IED 42 is a wireless network interface card (e.g., an IEEE 802.11x wireless local area network (WLAN) card) that enables communication between the IED 42 and the IED configuring system 62 on the wireless network 73. As mentioned above, in other embodiments, the wired network 71 may be alternatively be wireless. In still other embodiments, the IED 42 may include only one communication module (e.g., the wireless communication module 72) and the processor 48 may operate the one communication module to communicate with both the access point 40 and with the IED configuring device 62 using separate network stacks. In other embodiments, other types or organizations of communication modules are possible; however, it may be appreciated that the wireless network 73 may generally be isolated from other communication channels of the IED 42 for enhanced security.

The IED configuring device 62 illustrated in FIG. 3 includes a wireless access point component 74 and a configuration device component 76. In certain embodiments, the wireless access point component 74 may function as the host of the wireless network 73. In certain embodiments, the wireless access point component 74 may be a stand-alone wireless access point component 74, and may therefore include a processor 78 configured to establish and host the wireless network 73 according to a particular wireless network configuration stored in a memory 80. Further, in certain embodiments, the wireless access point component 74 may include a battery component 82 to supply the wireless access point component 74 with power during operation. In certain embodiments, the wireless access point component 74 may additionally or alternatively be coupled to the configuration device 76 to receive power during operation. By specific example, in certain embodiments, the wireless access point component 74 may be a wireless access point (WAP) that is designed to be physically coupled to the configuration device 76 (e.g., plugged into a universal serial bus (USB) connection of the configuration device 76) to receive power during operation.

The configuration device component 76 of the IED configuring device 62 illustrated in FIG. 3 may be a desktop computer or a portable computing device. By specific example, in certain embodiments, the configuration device component 76 may be a laptop, a tablet, a smart phone or another suitable computing device. The configuration device component 76 illustrated in FIG. 3 includes a processor 84 that is configured to execute one or more instructions stored in the memory 86 to control operations of the configuration device component 76. The illustrated configuration device component 76 also includes a communication module 88.

The communication module 88 may be a wired or wireless communication module (e.g., a wired or wireless network interface card (NIC)) that enables the configuration device component 76 to establish a wired or wireless connection 89 between the configuration device component 76 and the wireless access point component 74 of the IED configuring device 62. In other embodiments, the configuration device component 76 may include other communication modules (e.g., other wired or wireless network interfaces) to enable the configuration device component 76 to communicate with other computing devices, such as an IED configuration repository system, via the internet.

The configuration device component 76 of the IED configuring device 62 illustrated in FIG. 3 further includes one or more input and output devices 90. As discussed below, in certain embodiments, the input and output devices 90 of the configuration device component 76 may facilitate an operator's interaction with the IED configuring device 62. That is, as set forth in detail below, the input and output devices 90 may include a screen (e.g., a touchscreen, a monitor, or another suitable display) that may enable the configuration device component 76 of the IED configuring device 62 to present or display to the operator information regarding one or more IEDs 42 that have joined the wireless network hosted by the wireless access point component 74. Further, in certain embodiments, the input and output devices 90 may include one or more input devices (e.g., a touchscreen, a keyboard, a keypad, a pointing device, etc.) capable of receiving input from the operator regarding the desired IED configuration settings for the IED 42.

Figure 4:
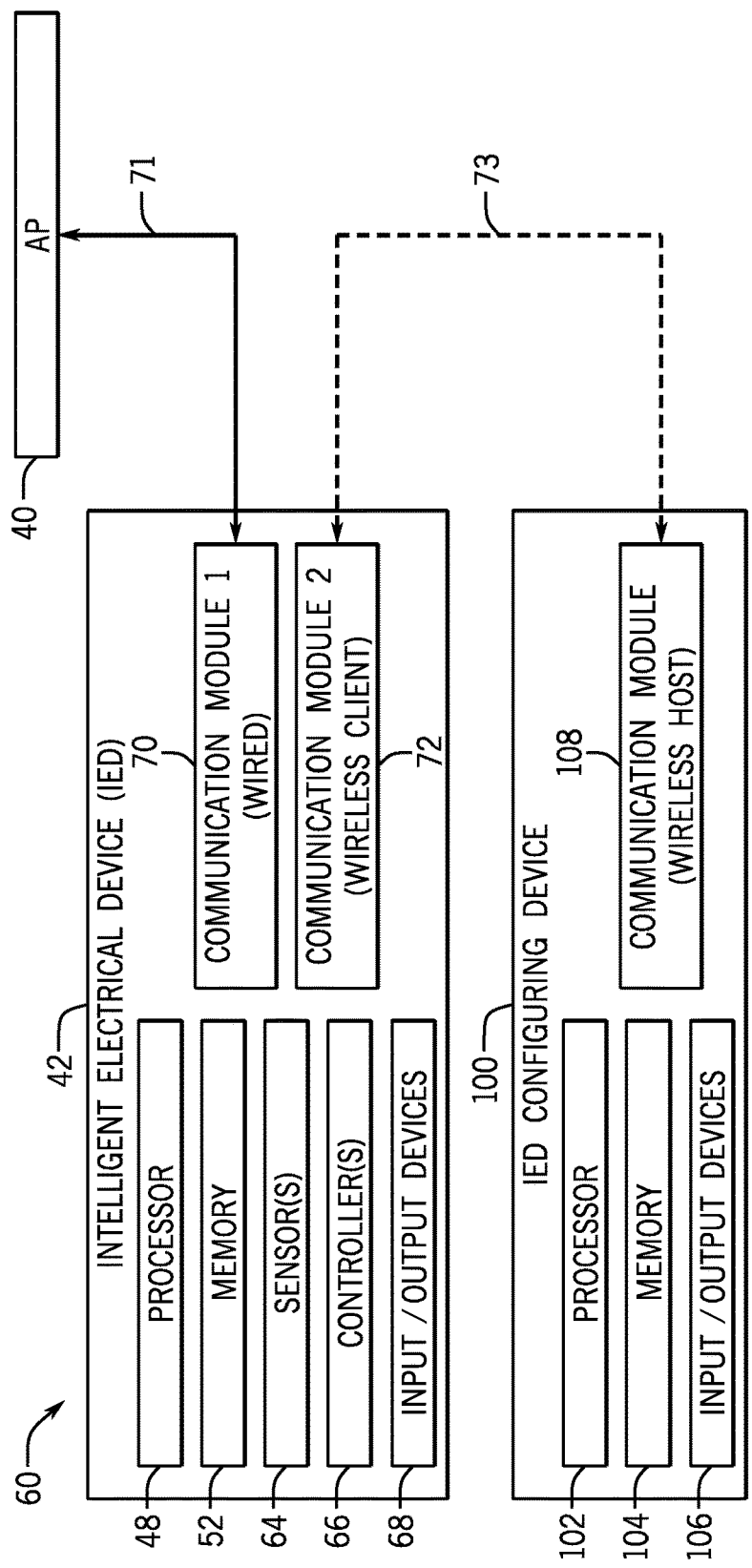
FIG. 4 is a block diagram of another embodiment of an IED configuring system having an IED configuring device with integrated wireless functionality.

FIG. 4 is a block diagram illustrating a schematic of an embodiment of the IED configuring system 60. While the IED 42 is the same as the IED 42 illustrated in FIG. 3, the IED configuring device 100 illustrated in FIG. 4 is different from the IED configuring device 62 illustrated in FIG. 3. In particular, rather than being organized into a wireless access point component 74 and a configuration device component 76, as illustrated in FIG. 3, the IED configuring device 100 illustrated in FIG. 4 is organized as a single, integrated device. As such, the IED configuring device 100 includes a processor 102 configured to execute one or more instructions stored in the memory 104 during operation. Additionally, the IED configuring device 100 may include one or more input and output devices 106 that operate like the one or more input and output devices 90 of the configuration device component 76, discussed above, to facilitate the presentation of information to and the receipt of input from an operator of the IED configuring device 100. Further, the IED configuring device 100 illustrated in FIG. 4 includes a communication module 108 that is configured to host a wireless network (e.g., WAP functionality) that provides the wireless connection 73 between the IED 42 and the IED configuring device 100. In certain embodiments, the communication module 108 may function as a wireless access point (WAP) that may enable a plurality of IED 42 to join the hosted wireless network. In other embodiments, the communication module 108 may be implemented as a wireless network interface card (NIC) operated in an IEEE 802.11x ad-hoc networking mode to host the wireless network 73 for a single IED 42 to connect to at a time.

Figure 5:
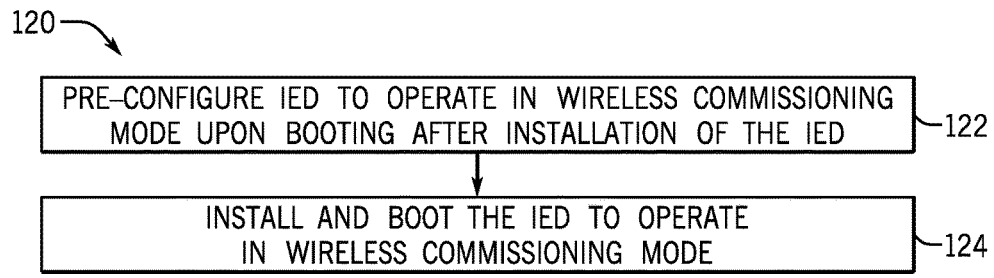
FIG. 5 is a flow diagram illustrating an embodiment of a process whereby an IED may be deployed.

With the foregoing in mind, FIG. 5 is a flow diagram illustrating an embodiment of a process 120 whereby an IED may be prepared and deployed. That is, as set forth above, the IEDs 42 and the IED configuring devices 62 and 100 may automatically form the wireless network 73 that is generally based on a plurality of wireless configuration settings that are pre-programmed into the IED 42 before deployment (e.g., by manufacturer before shipping to the customer and/or being installed at the customer location). As such, the illustrated process 120 begins with the IED being pre-configured (block 122) to operate in a wireless commissioning mode upon booting after installation. This pre-configuration is discussed in greater detail below from the perspective of the IED in FIG. 7, and wireless commissioning mode is discussed in greater detail below from the perspective of the IED in FIG. 8. Once the IED has been preconfigured, the IED may be installed (e.g., in a protection and control system 36 as illustrated in FIG. 2) and then booted (block 124) to operate in wireless commissioning mode.

Figure 6:
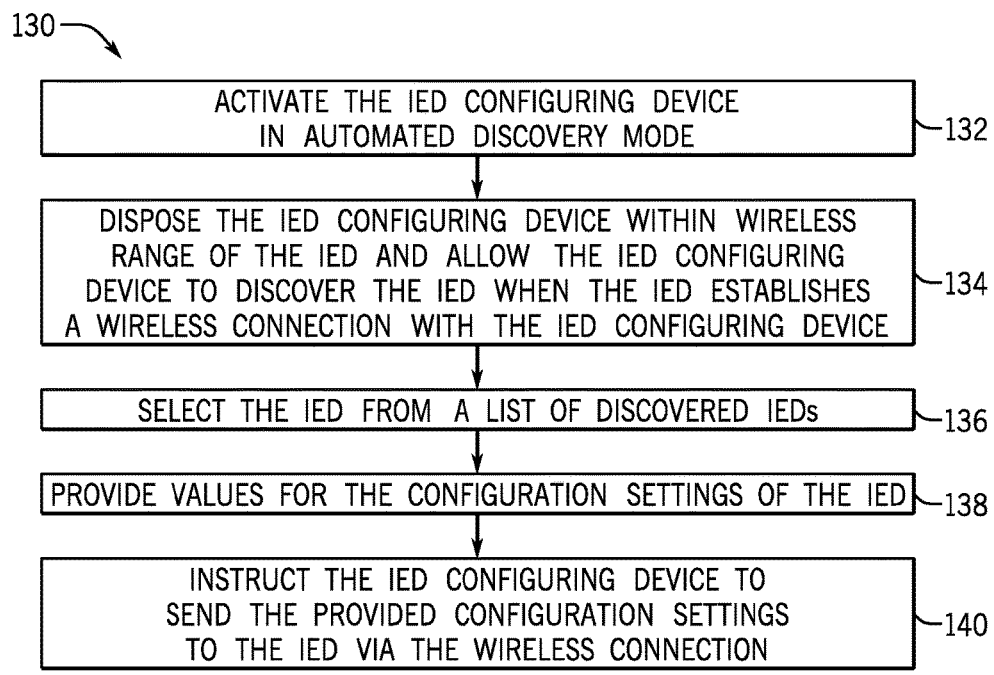
FIG. 6 is a flow diagram illustrating an embodiment of a process whereby the IED configuring device may be used to commission an IED.

FIG. 6 is a flow diagram illustrating an embodiment of a process 130 whereby the IED configuring device may be used by an operator to commission an IED. As such, the illustrated process 130 begins with the operator activating (block 132) the IED configuring device (e.g., IED configuring device 62) in an automated discovery mode. Automated discovery mode is discussed in greater detail below from the perspective of the IED configuring device in FIG. 9. The process 130 illustrated in FIG. 6 continues when the operator disposes (block 134) the IED configuring device 62 within wireless range of the IED 42 and allows the IED configuring device 62 to discover the IED when the IED establishes a wireless connection 73 with the IED configuring device 62. Subsequently, in certain embodiments, the operator may be presented with a list of discovered IEDs 42 (e.g., via the output devices 90). The operator may then select (e.g., via the input devices 90) the IED 42 to be commissioned from the list of discovered IEDs (block 136).

Continuing through the process 130 illustrated in FIG. 6, next the operator may be presented with the configuration settings for the selected IED 42. For example, the IED configuring device 62 may utilize one or more output devices 90 to present to the operator with a graphical user interface (GUI) that displays the current (e.g., the pre-configured or pre-programmed) IED configuration settings. This GUI may include one or more editable fields (e.g., a text box, radio button, combo box, select box, and so forth) for each configuration setting of the IED. In certain embodiments, this GUI may further include predefined values (e.g., in combo or select boxes) that the operator to choose from for certain IED configuration settings. Accordingly, the operator may then provide (e.g., via input devices 90) values for the configuration settings of the IED 42 (block 138). Finally, the operator may instruct (block 140) the IED configuring device 52 to send the provided configuration settings to the IED 42 via the wireless connection established in block 134.

Figure 7:
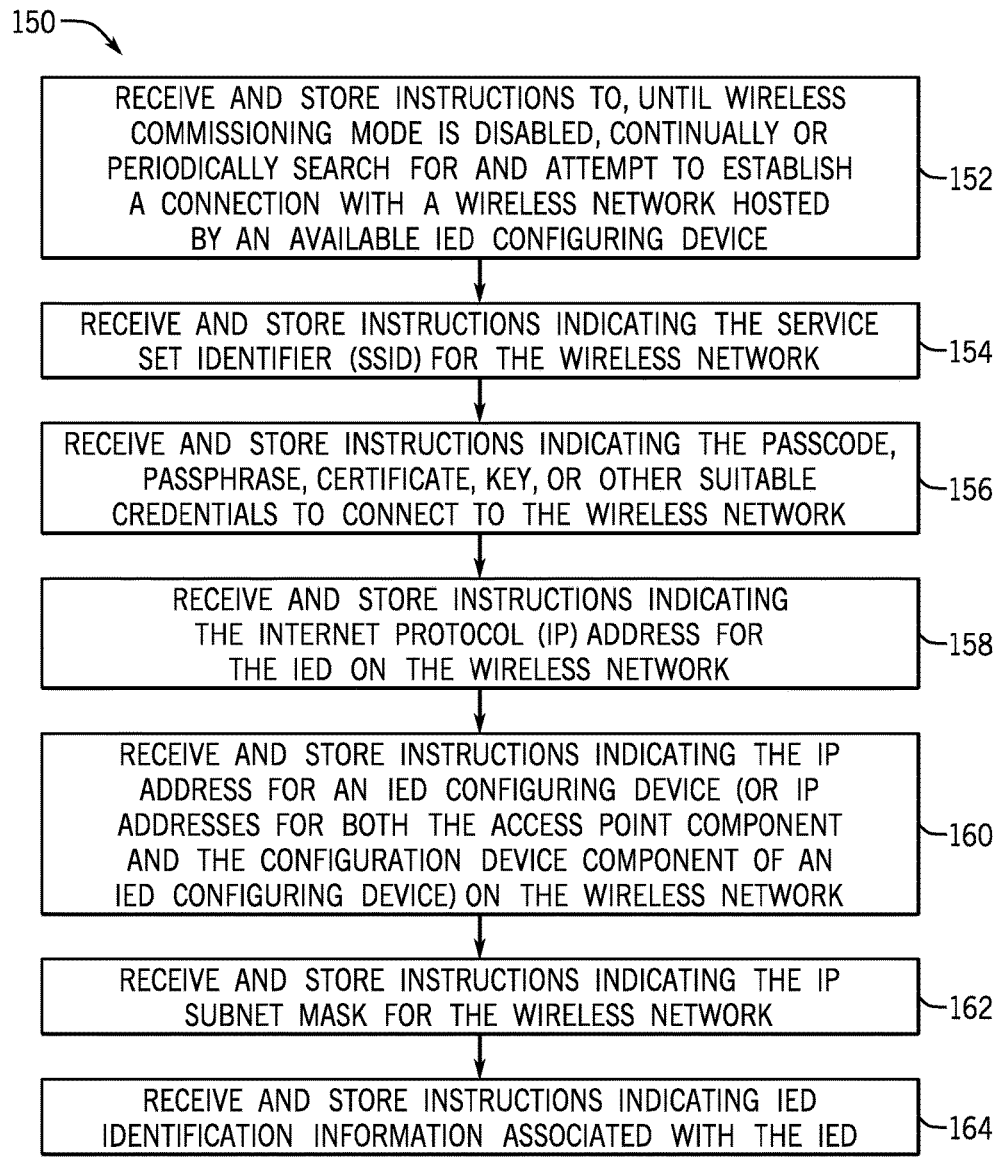
FIG. 7 is a flow diagram illustrating an embodiment of a process whereby the IED may be pre-configured prior to deployment.

FIG. 7 is a flow diagram illustrating an embodiment of a process 150 whereby the IED may be pre-configured (e.g., by the manufacturer) prior to deployment. In particular, the process 150 may generally pre-configure or pre-program the behavior of the IED when operating in wireless commissioning mode. As such, the illustrated pre-configuration process 150 begins with the IED receiving and storing (block 152) instructions to, until wireless commissioning mode is disabled, continually or periodically search for and attempt to establish a connection with a wireless network 73 hosted by an available IED configuring device (e.g., IED configuring device 62).

The illustrated pre-configuration process 150 illustrated in FIG. 7 continues with the IED 42 receiving and storing (block 154) instructions indicating the service set identifier (SSID) for the wireless network. The IED 42 may receive and store (block 156) instructions indicating the passcode, passphrase, certificate, key, or other suitable credentials to connect to the wireless network 73. For example, in certain embodiments, the wireless network 73 may be an IEEE 802.11x wireless local area network (WLAN) configured to use a method of authentication that depends on each wireless client providing the correct pre-shared key (PSK). By specific example, in certain embodiments, specific cryptographic algorithms in conjunction with PSK may be used, such as Wi-Fi protected access (WPA) or Wi-Fi protected access II (WPA2), or another suitable authentication mechanism based on the IEEE 802.11i standard for data encryption. It may be appreciated WPA/WPA2 may include specific encryption algorithms, such as TKIP (Temporal Key Integrity Protocol) and/or CCMP (Counter Mode with Cipher Block Chaining Message Authentication Code Protocol), which provide an enhanced data cryptographic encapsulation mechanism based on AES (Advanced Encryption Standard). In certain embodiments, the IED may be pre-configured with a passphrase (e.g., a string of hexadecimal or American standard code of information interchange (ASCII) characters) that may be used to generate the correct key to authenticate with the wireless network. By specific example, in certain embodiments, a WPA2 passphrase (e.g., a string of 8 to 14 printable ASCII characters) may be used to internally generate an encryption key (e.g., a 256-bit encryption key) to enable the IED to connect to the wireless network 73.

The illustrated pre-configuration process 150 illustrated in FIG. 7 continues with the IED 42 receiving and storing (block 158) instructions indicating the Internet protocol (IP) address for the IED 42 on the wireless network 73. It may be appreciated that, since the wireless network 73 hosted by the IED configuring devices 62 or 100 may enable the simultaneous connection of multiple IEDs as wireless clients, the IP address received and stored by the IED 42 in block 158 may be unique to prevent IP conflicts between different IEDs 42 installed within the same system (e.g., the protection and control system 36). That is, for a group of IEDs 42 being pre-programmed to be sent to a particular customer, each IED 42 of the group may receive, store, and utilize a unique IP address for communicating in the wireless network. For example, in certain embodiments, the IP address and mask may be chosen to belong to a private range (e.g., 192.168.0.x/24), wherein x may be calculated based on a serial number of the IED serial number. By specific example, in certain embodiments, the IP address for an IED may be calculated or generated by determining the modulo 252 of the last three 3 digits of the IED serial number and then adding 2 (e.g., x=(Last_three_digits_of_serial MOD 252)+2). As a result, x may have any value between 3 and 254 for the last digit of the IP address, which allows two IP addresses (i.e., x=1 and x=2) to be reserved for the wireless access point component 74 and the configuration device 76, respectively. Further, this generated IP address may generally prevent any two IEDs installed at the same location from having the same default IP address as each other and from having the same IP address as the wireless access point component 74 or configuration device component 76 of the IED configuring device 62.

Additionally, for embodiments having the IED configuring device 100 illustrated in FIG. 4, the IED 42 may receive and store (block 160) instructions indicating the IP address for the IED configuring device 100. For embodiments having the IED configuring device 62 illustrated in FIG. 3, the IED 42 may also receive and store instructions indicating the IP addresses for both the access point component 74 (e.g., the wireless host) and the configuration device component 76 of the IED configuring device 62 on the wireless network 73. This may enable the IED configuring device 100, as well as the configuration device component 76 and the wireless access point component 74 of the IED configuring device 62, to reserve one or more IP addresses (e.g., IP addresses X.X.X.1 and X.X.X.2) for the IED configuring device 100 or 62 in order to avoid IP conflicts with one or more IED devices on the wireless network.

The illustrated pre-configuration process 150 illustrated in FIG. 7 continues with the IED 42 receiving and storing (block 162) instructions indicating the IP subnet mask for the wireless network. Additionally, the wireless configuration parameters illustrated in FIG. 7 are not intended to be exhaustive, and that the IED 42 may be pre-configured with any other suitable wireless network configuration information. Furthermore, in addition to the wireless network configuration information provided to and stored by the IED 42, in certain embodiments, the IED 42 may receive and store (block 164) instructions indicating identification information that is associated with the IED 42. For example, the identification information may include a serial number of the IED 42, a tracking number of the IED 42, an intended or anticipated location of the IED 42 within the protection and control system 36, a name of the IED 42, a model number of the IED 42, a firmware version of the IED 42, or any other suitable identification information associated with the IED 42. It may be appreciated that while the blocks 152, 154, 156, 158, 160, 162, and 164 are presented in a particular order, in other embodiments, the illustrated process 150 may be performed and other sequences without negating the effect of the present approach.

Figure 8:
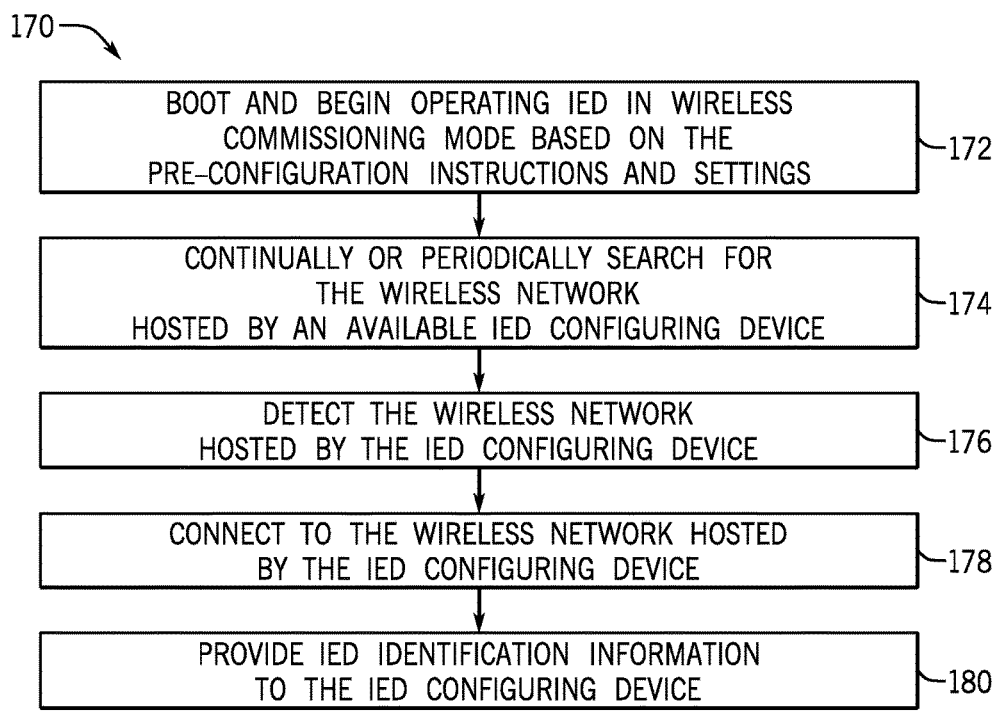
FIG. 8 is a flow diagram illustrating an embodiment of a process whereby the IED may operate in wireless commissioning mode.

FIG. 8 is a flow diagram illustrating an embodiment of a process 170 whereby the IED 42 may operate in a wireless commissioning mode. That is, after the IED 42 has been pre-configured and installed (e.g., according to the process 120 illustrated in FIG. 5), the IED 42 may automatically operate in wireless commissioning mode when powered. Accordingly, the process 170 begins with the IED booting and beginning operation (block 172) in wireless commissioning mode based on the pre-configuration instructions and settings, as discussed with respect to FIG. 7. When operating in wireless commissioning mode, the IED may continually or periodically search (block 174) for the SSID beacon of the wireless network hosted by an available IED configuring device 62 or 100.

Continuing through the process 170 illustrated in FIG. 8, at some point, the IED 42 may detect (block 176) the SSID beacon of the wireless network hosted by the IED configuring device 62 or 100. Then, the IED 42 may connect (block 178) to the wireless network 73 hosted by the IED configuring device 62 or 100. More specifically, for embodiments using the IED configuring device 62, the IED 42 may connect to the wireless access point component 74 of the IED configuring device 62 and may reside on the same network (e.g., wireless network 73) as the configuration device component 76 of the IED configuring device 62. Further, in certain embodiments, the IED 42 may provide (block 180) IED identification information, discussed above, to the IED configuring device 62 or 100. More specifically, for embodiments using the IED configuring device 62, the IED 42 may provide the IED identification information to the configuration device component 76 of the IED configuring device 62.

Figure 9:
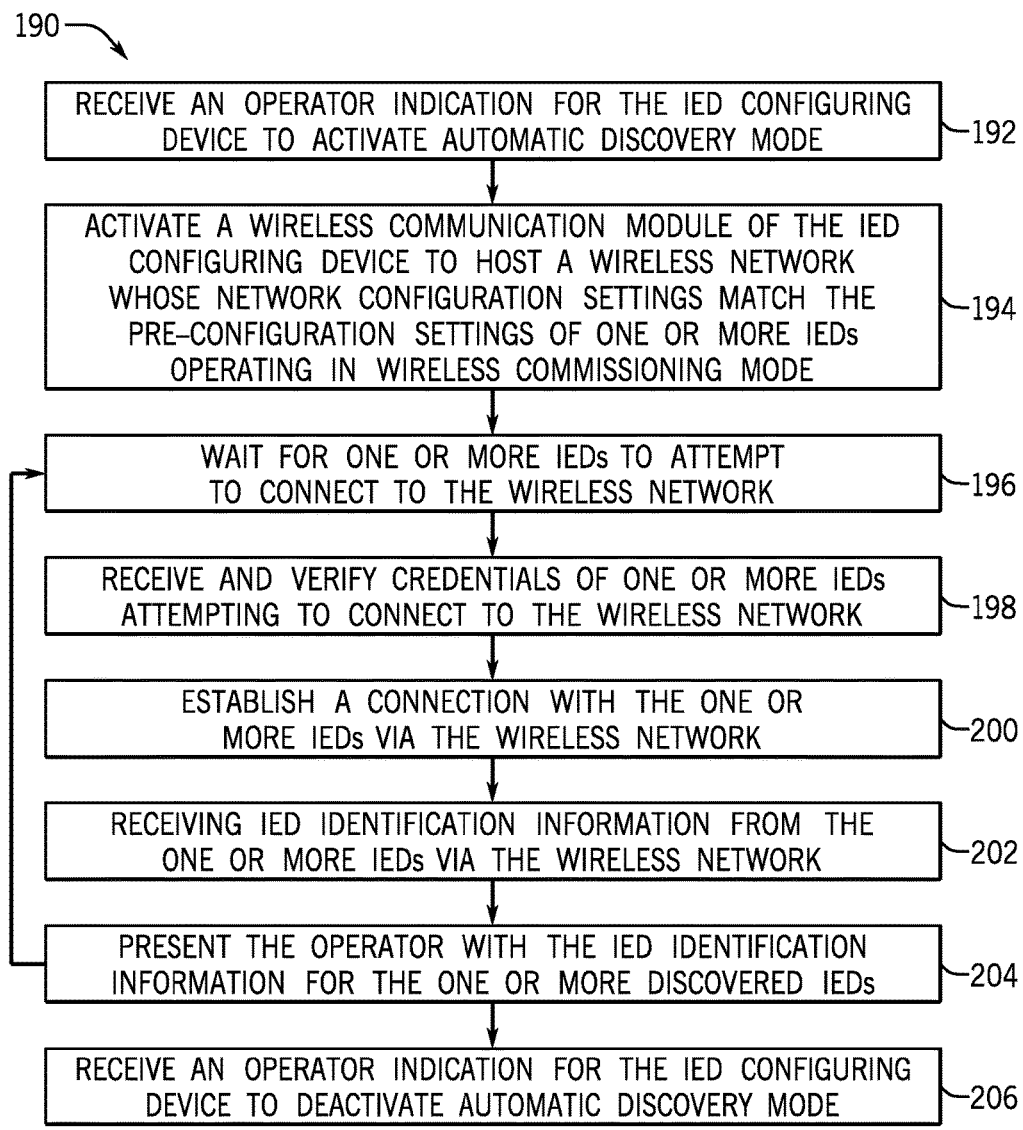
FIG. 9 is a flow diagram illustrating an embodiment of a process whereby the IED configuring device may operate in automatic discovery mode.

FIG. 9 is a flow diagram illustrating an embodiment of a process 190 whereby the IED configuring device 62 or 100 may operate in automatic discovery mode. That is, after one or more IEDs 42 to be commissioned have been pre-configured, installed, and are operating in wireless commissioning mode, as discussed above, the IED configuring device (e.g., IED configuring device 62 or 100) may function according to the process 190 to automatically discover or detect all IEDs 42 that are in wireless commissioning mode and are within wireless range. The process 190 illustrated in FIG. 9 begins with the IED configuring device 62 receiving (block 192) an operator indication for the IED configuring device 62 to activate automatic discovery mode. In response, the IED configuring device 62 may activate (block 194) a wireless communication module (e.g., wireless access point component 74) to host a wireless network whose network configuration settings match the pre-configuration setting of one or more IEDs 42 operating in wireless commissioning mode. Accordingly, the IED configuring device 62 may wait (block 196) for the one or more IEDs 42 in wireless commissioning mode to attempt to connect to the wireless network.

Continuing through the process 190 illustrated in FIG. 9, the IED configuring device 62 may receive and verify (block 198) credentials of one or more IED 42 attempting to connect the wireless network, and may establish (block 200) a connection (e.g., a secure connection via the wireless network 73) with the one or more IEDs 42 via the wireless network. Subsequently, in certain embodiments, the IED configuring device 62 may receive (block 202) IED identification information from the one or more IEDs 42 via the wireless network. Then, the IED configuring device 62 may present (block 204) the operator with the IED identification information received from the one or more discovered IEDs. As indicated by the arrow 206, in certain embodiments, the IED configuring device 62 may repeat blocks 196, 198, 200, 202, and 204 over a period of time and may continually update the list of discovered IEDs as new IEDs are discovered. At some later time, the IED configuring device 62 may receive (block 208) an operator indication for the IED configuring device 52 to deactivate automatic discovery mode and may discontinue hosting of the wireless network.

Figure 10:
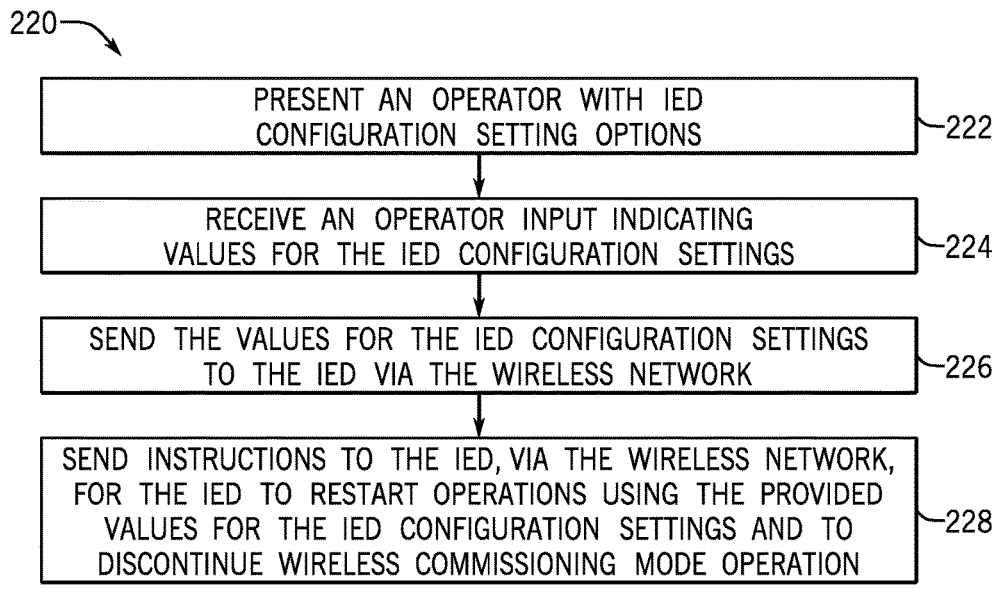
FIG. 10 is a flow diagram illustrating an embodiment of a process whereby the IED configuring device may receive configuration settings for the IED from an operator and provide the configuration settings to the IED.

FIG. 10 is a flow diagram illustrating an embodiment of a process 220 whereby the IED configuring device 62 or 100 may receive configuration settings for an IED 42 from an operator (e.g., via the aforementioned input/output devices 90 or 106, such as a touchscreen display device) and provide the configuration settings to the IED 42. That is, once the operator has selected a particular IED 42 to be commissioned from a list of discovered IEDs, the operator may be prompted to provide IED configuration settings for the selected IED 42. As mentioned above, in certain embodiments, the IED configuring device 62 or 100 may present on a display the current (e.g., pre-configured) values for the IED configuration settings, including the IED identification information discussed above. With this in mind, the illustrated process 220 begins with the IED configuring device 62 or 100 presenting (block 222) or displaying the operator with options for the IED configuration settings. It may be noted that, in certain embodiments, the IED configuring device 62 or 100 may specifically prompt the operator, via the display, to provide updated wireless network configuration settings for the IED 42. In particular, to improve security in the protection and control system 36 illustrated in FIG. 2, the IED configuring device 62 or 100 may prompt the operator, via the display, to provide a new SSID, network security passphrase or key, IP address, IP subnet mask, or other suitable wireless network configuration settings for IED 42. In certain embodiments, the IED configuring device 62 or 100 may present the operator with a GUI, via the display, having editable fields and/or pre-filled options (e.g., select or combo boxes) for different IED configuration settings, including wireless network configuration settings for the IED 42. As such, the IED configuring device 62 or 100 may receive (block 224) operator input indicating values for the IED configuration settings.

Continuing through the process 220 illustrated in FIG. 10, next the IED configuring device 62 or 100 may send (block 226) the values for the IED configuration settings received from the operator to the IED 42 via the wireless network 73. Furthermore, in certain embodiments, the IED configuring device 62 or 100 may send (block 228) instructions to the IED 42, via the wireless network 73, for the IED 42 to restart operations using the provided values for the IED configuration settings and to discontinue wireless commissioning mode operation. In other embodiments, as discussed below, the IED 42 may automatically restart operations and discontinue wireless commissioning mode operation after receiving the values for the IED configuration settings sent by the IED configuring device 62 or 100.

Figure 11:
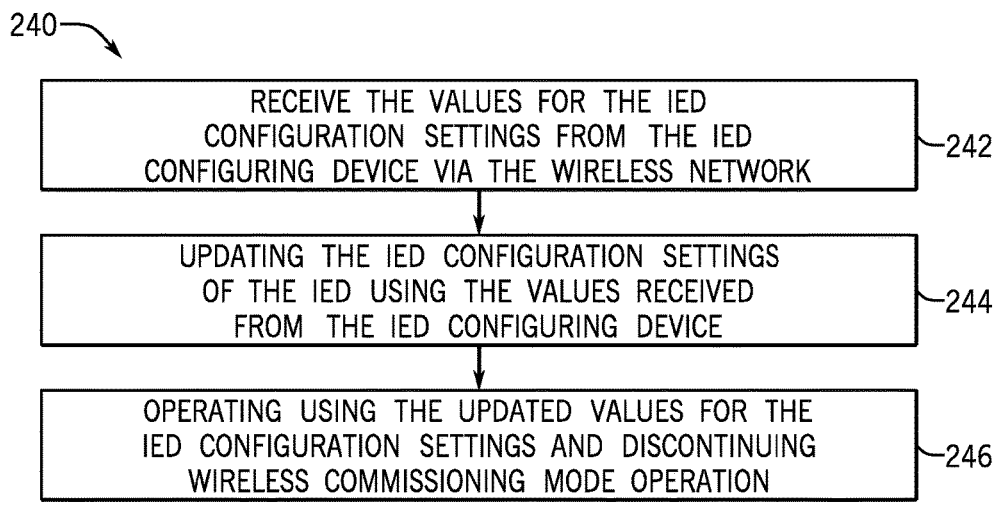
FIG. 11 is a flow diagram illustrating an embodiment of a process whereby the IED may receive configuration settings from the IED configuring device and complete the commissioning process.

FIG. 11 is a flow diagram illustrating an embodiment of a process 240 whereby the IED 42 may receive IED configuration settings from the IED configuring device 62 or 100 and complete the commissioning process. The process 240 illustrated in FIG. 11 begins with the IED 42 receiving (block 242) the values for the IED figuration settings from the IED configuring device via the wireless connection 73. Subsequently, the IED may update (block 244) the IED configuration settings of the IED 42 using the values received from the IED configuring device 62 or 100 via the wireless connection 73. In certain embodiments, the IED 42 may then reboot, restart, or cycle power. Finally, the illustrated process 240 ends with the IED 42 operating (block 246) using the updated values for the IED configuration settings and discontinuing wireless commissioning mode operation.

Technical effects of the disclosed embodiments include the ability to commission installed IEDs without on-site physical interaction (i.e., touch-less IED commissioning). That is, present embodiments provide systems and methods that enable a touch-less initial configuration of an IED using a secured communication via a wireless local area network (WLAN) based on an IEEE 802.11x standard. Since certain systems, such as power grid systems as well as protection and control systems, may include IEDs controlling high voltage equipment, IEDs disposed in hard to reach locations, and/or a multitude of IEDs spread over a large physical space, present embodiments enable the operator to commission the IED from a distance and in a secure manner. Present embodiments include a pre-configured IED that operates in a wireless commissioning mode that searches for an available IED configuring device until the IED has been successfully commissioned. The wireless commissioning mode enables the IED to automatically establish a secure wireless connection with an available IED configuring device operating in automatic discovery mode. Once the IED and the IED configuring device share a secure wireless connection, the initial configuration may be performed to commission the IED without physically interacting with the IED.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
an intelligent electronic device (IED) configuring system, comprising:
an IED configuring device configured to host a first wireless network; and
an IED configured to:
initiate operations with a first wireless network configuration stored prior to deployment using a wireless commissioning mode operation;
automatically detect the first wireless network;
connect to the first wireless network when the IED detects the first wireless network using the first wireless network configuration using a service set identifier (SSID) and one or more authentication credentials for the first wireless network;
receive a plurality of configuration settings from the IED configuring device, wherein the plurality of configuration settings include a plurality of values for configuring the IED to connect to a second wireless network;
reboot to discontinue operation of the wireless commissioning mode; and
initiate operations with the second wireless network using the plurality of values received from the IED configuring device.

2. The system of claim 1, wherein the IED configuring device comprises an access point component, wherein the access point component hosts the first wireless network.

3. The system of claim 2, wherein the IED configuring device comprises a configuration device component, wherein the configuration device component connects to the first wireless network hosted by the access point component and communicates the plurality of configuration settings to the IED via the first wireless network.

4. The system of claim 3, wherein the configuration device component comprises a tablet computer, a laptop computer, or a smart phone computing device.

5. The system of claim 3, wherein the first wireless network configuration comprises an internet protocol (IP) address of the access point component of the IED configuring device, and an IP address of the configuration device component of the IED configuring device.

6. The system of claim 1, wherein the first wireless network configuration comprises the service set identifier (SSID) of the first wireless network, a network security key or passphrase of the first wireless network, and an internet protocol (IP) address for the IED on the first wireless network.

7. The system of claim 6, wherein the IP address for the IED is generated from at least a portion of a serial number associated with the IED.

8. The system of claim 1, wherein the IED configuring device comprises one or more input devices configured to receive input from an operator indicating the plurality of configuration settings for the IED.

9. The system of claim 1, wherein the IED comprises a first communication module and a second communication module, wherein the first communication module enables the IED to connect to the first wireless network, and wherein the second communication module enables the IED to separately communicate with other devices.

10. The system of claim 1, wherein the system is a power grid system, a protection and control system, an industrial plant, a power distribution system, or any combination thereof.

11. A method, executable by a processor of an intelligent electronic device (IED), comprising:
   storing, in a memory device of the IED, a first wireless network configuration that includes a service set identifier (SSID) of a first wireless network and a network security key or passphrase of the first wireless network;
   initiating operations with the first wireless network configuration stored prior to deployment using a wireless commissioning mode operation;
   automatically detecting the first wireless network;
   connecting to the first wireless network using the stored wireless network configuration including a service set identifier (SSID) and one or more authentication credentials for the first wireless network;
   locating and connecting to the first wireless network while operating in the wireless commissioning mode operation;
   receiving a plurality of IED configuration settings from a processor coupled to the first wireless network, wherein the plurality of IED configuration settings include a plurality of values for configuring the IED to connect to a second wireless network;
   commissioning the IED by updating a configuration of the IED stored in the memory device of the IED with the received plurality of IED configuration settings; and
   rebooting to discontinue operation of the wireless commissioning mode; and
   initiate operations with the second wireless network using the plurality of values received from the IED configuring device.

12. The method of claim 11, wherein the first wireless network configuration comprises an internet protocol (IP) address of an access point component of an IED configuring device and an IP address of a configuration device component of the IED configuring device that includes the processor.

13. The method of claim 11, wherein the first wireless network configuration comprises an internet protocol (IP) address for the IED on the first wireless network.

14. The method of claim 13, wherein the IP address of the IED is configured to be unique relative to a plurality of IP addresses respectively stored in a plurality of IEDs for installation within a common system.

15. The method of claim 11, wherein commissioning the IED comprises updating the configuration of the IED with the received plurality of IED configuration settings without an operator physically interacting with the IED.

16. A method, comprising:
   storing, in a memory device of an intelligent electronic device (IED) configuring device, a first wireless network configuration that includes a service set identifier (SSID) of a first wireless network and a network security key or passphrase of the first wireless network;
   operating the IED configuring device in automatic discovery mode, wherein automatic discovery mode comprises activating a communication module of the IED configuring device to establish the first wireless network based on the wireless network configuration;
   authenticating one or more credentials provided by an IED and allowing the IED to connect to the first wireless network, wherein the IED is operating in a wireless commissioning mode;
   receiving, via at least one input device of the IED configuring device, a plurality of IED configuration settings from an operator for the IED, wherein the plurality of IED configuration settings include a plurality of values for configuring the IED to connect to a second wireless network; and
   sending, via the first wireless network, the plurality of IED configuration settings to the IED to restart the IED, wherein the IED is configured to reboot to discontinue operation of the wireless commissioning mode and to initiate operations with the second wireless network using the plurality of values received from the IED configuring device.

17. The method of claim 16, comprising rejecting the one or more credentials provided by the IED and not allowing the IED to connect to the first wireless network when the one or more credentials do not match the wireless network configuration.

18. The method of claim 16, comprising presenting, via at least one output device of the IED configuring device, an operator with a list of a plurality of IEDs, including the IED, that have been authenticated and have connected to the first wireless network.

* * * * *